United States Patent
Kelch et al.

(10) Patent No.: US 12,053,890 B2
(45) Date of Patent: Aug. 6, 2024

(54) ROBOTIC WORKSPACE INTROSPECTION VIA FORCE FEEDBACK

(71) Applicant: Intrinsic Innovation LLC, Mountain View, CA (US)

(72) Inventors: Timothy Robert Kelch, San Jose, CA (US); Dirk Holz, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 192 days.

(21) Appl. No.: 17/338,401

(22) Filed: Jun. 3, 2021

(65) Prior Publication Data
US 2022/0388171 A1    Dec. 8, 2022

(51) Int. Cl.
*B25J 9/16*    (2006.01)
*B25J 13/08*    (2006.01)

(52) U.S. Cl.
CPC .......... *B25J 9/1671* (2013.01); *B25J 13/085* (2013.01)

(58) Field of Classification Search
CPC ...... B25J 9/1671; B25J 13/085; B25J 9/1633; B25J 9/1692; B25J 9/1674; G05B 2219/39014; G05B 2219/39529; G05B 2219/40323; G05B 2219/40541; G05B 2219/40599
See application file for complete search history.

(56) References Cited

U.S. PATENT DOCUMENTS

| 2011/0035087 A1* | 2/2011 | Kim ..................... G05D 1/0217 |
| | | 701/25 |
| 2013/0178980 A1* | 7/2013 | Chemouny ............ B25J 9/1666 |
| | | 700/255 |

(Continued)

FOREIGN PATENT DOCUMENTS

| CN | 103778301 A | 5/2014 |
| CN | 108297083 | 7/2018 |

(Continued)

OTHER PUBLICATIONS

Roberts, K. "Robot Active Touch Exploration:Constraints and Strategies", 1989, Columbia University Technical Report CUCS-480-89.*

(Continued)

*Primary Examiner* — Adam R Mott
*Assistant Examiner* — Sagar Kc
(74) *Attorney, Agent, or Firm* — Fish & Richardson P.C.

(57) ABSTRACT

In one aspect, there is provided a computer-implemented method that includes receiving a request to generate workcell data representing physical dimensions of a workcell having a physical robot arm, executing a calibration program that causes the physical robot arm to move within the workcell and record locations within the workcell at which the robot arm made contact with an object, generating, from the locations within the workcell at which one or more sensors of the robot arm recorded a resistance above a threshold, a representation of physical boundaries in the (Continued)

workcell, obtaining an initial virtual representation of the workcell, and updating the initial virtual representation of the workcell according to the representation of physical boundaries generated from executing the calibration program.

17 Claims, 4 Drawing Sheets

(56) References Cited

U.S. PATENT DOCUMENTS

| | | | |
|---|---|---|---|
| 2016/0016311 A1* | 1/2016 | Konolige | B25J 9/1664 901/30 |
| 2016/0158942 A1* | 6/2016 | Augenbraun | G05D 1/0227 901/10 |
| 2020/0101610 A1* | 4/2020 | Thackston | B25J 9/1612 |
| 2020/0134830 A1* | 4/2020 | Yu | G06T 7/174 |
| 2020/0206919 A1* | 7/2020 | Nakayama | B25J 9/163 |
| 2020/0249654 A1 | 8/2020 | Edwards et al. | |
| 2020/0262081 A1 | 8/2020 | Augenbraun et al. | |
| 2020/0276708 A1* | 9/2020 | Shah | B25J 19/04 |
| 2021/0046655 A1* | 2/2021 | Deyle | B25J 9/1664 |
| 2021/0107157 A1* | 4/2021 | Bai | B25J 9/1692 |
| 2021/0383550 A1* | 12/2021 | Yu | B25J 19/023 |
| 2022/0331972 A1* | 10/2022 | Hama | B25J 9/1671 |

FOREIGN PATENT DOCUMENTS

| | | | |
|---|---|---|---|
| CN | 110625600 A | * 12/2019 | ............ B25J 9/0081 |
| EP | 3705239 | 9/2020 | |
| JP | 2018530449 | 10/2018 | |
| WO | WO2017060538 | 4/2017 | |

OTHER PUBLICATIONS

International Search Report and Written Opinion in International Appln. No. PCT/US2022/032095, Oct. 4, 2022, 20 pages.

Kaboli et al., "Tactile-based active object discrimination and target object search in an unknown workspace," Autonomous Robots, Feb. 19, 2018, 43(1):123-152.

Roberts, "Robot Active Touch Exploration: Constraints and Strategies," IEEE International Conference on Robotics and Automation, May 13, 1990, pp. 980-985.

Seminara et al., "Active Haptic Perception in Robots: A Review," Frontiers in Neurobotics, Jul. 17, 2019, 13(53):20 pages.

faro.com [online], "Quantum Max FaroArm® Series," Mar. 2021, retrieved on Jan. 27, 2022, retrieved from URL<https://www.faro.com/en/Products/Hardware/Quantum-FaroArms/>, 7 pages.

Linde et al., "HapticMaster—a generic force controlled robot for human interaction," Industrial Robot, Dec. 2003, 30(6):515-524.

International Preliminary Report on Patentability in International Appln. No. PCT/US2022/032095, Dec. 14, 2023, 13 pages.

* cited by examiner

ROBOTIC WORKSPACE INTROSPECTION VIA FORCE FEEDBACK

BACKGROUND

This specification relates generally to robotics. More specifically, this specification relates to methods and systems for generating a representation of physical boundaries of objects in a robotic operating environment.

Industrial manufacturing heavily relies on robotics for automation. As the complexity of automated manufacturing processes have increased over time, so has the demand for robotic systems capable of high precision and excellent performance. This, in turn, prompted attempts to use off-line programming and simulation tools to improve the performance of robotic systems on the manufacturing floor.

A major limitation of off-line programming depends on having highly accurate parity between the virtual representation of the workcell and the physical workcell. In particular, accurately representing the relative positioning of the robot with respect to objects in the virtual environment presents one of the largest blockers towards greater usage of off-line programming. Generally, the better the physical workcell environment is represented in the virtual world, the more effectively it can be calibrated for precise contact operations. An off-line generated robot program that is based on a simulation with maximum correspondence between the virtual and the physical workcell can drive the physical robot with maximum accuracy and precision.

Obtaining information about the physical operating environment often relies on measurements from a camera that is positioned in the environment or attached to the robot. However, such measurements have inherent limitations, due to, e.g., only a fraction of the operating environment being visible at a time, some viewpoints providing less information than other viewpoints, and some viewpoints being entirely inaccessible. For example, if the camera is positioned on the head of a robot, it may be difficult, or impossible, to accurately determine if any objects are present behind the robot. Because some robots are designed to operate in three dimensions and are suited to perform a wide range of tasks, this can pose a risk of collisions with objects if the robot program is not accurately calibrated. Accordingly, there exists a growing need for systems and methods that can improve the accuracy of simulation of the robotic workcell and thereby improve precision and safety of robotic operation.

SUMMARY

This specification describes methods and systems for generating a representation of physical boundaries of objects in a robotic operating environment.

According to a first aspect, there is provided a computer-implemented method that includes receiving a request to generate workcell data representing physical dimensions of a workcell having a physical robot arm, executing a calibration program that causes the physical robot arm to move within the workcell and record locations within the workcell at which the robot arm made contact with an object, generating, from the locations within the workcell at which one or more sensors of the robot arm recorded a resistance above a threshold, a representation of physical boundaries in the workcell, obtaining an initial virtual representation of the workcell, and updating the initial virtual representation of the workcell according to the representation of physical boundaries generated from executing the calibration program.

Particular embodiments of the subject matter described in this specification can be implemented so as to realize one or more of the following advantages.

While many industrial robotic systems have excellent repeatability, the accuracy of movements and operations can suffer significantly due to the physical operating environment not being accurately represented in the simulation. Furthermore, the virtual model can often be limited by measurements obtained from a camera that may not necessarily provide complete information. Having the ability to accurately represent the relative position of the robot with respect to objects in the simulation can significantly improve the accuracy of robotic systems.

Building a more accurate representation of the operating environment can include obtaining force measurements from a force sensor at object boundaries in the workcell. For example, a human operator can guide a robot arm such that it contacts one or more points at a boundary of an object in the workcell and measures the reaction force with a force sensor provided at the tip of the arm. The location at which the force has been recorded, and the magnitude of the force, can be processed by the system. In another example, the robot can autonomously explore the workcell and discover locations of points at which the force sensor measures a force above a particular threshold. On the basis of these measurements, a spatial map of the environment can be generated so as to more accurately capture the locations of objects and object boundaries in the workcell that may not necessarily be accessible to the robot through other measurements, e.g., those obtained through a camera. The virtual representation of the workcell can accordingly be updated, thereby attaining parity between the physical world and its virtual counterpart.

By employing the described techniques, a robot system can be provided with accurate representation of physical boundaries in the robotic operating environment that can then allow it to effectively generate motion plans for controlling the robot system, e.g., by generating initial plan that is based on the force sensor observations of the workcell, or by generating modified plans to avoid collision of a robot with physical objects in the workcell. Furthermore, the described techniques facilitate the discovery of kinematic configurations of the robot that facilitate access to locations in the operating environment.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Like reference numbers and designations in the various drawings indicate like elements.

The systems and methods described in this specification improve the accuracy of simulation of the robotic operating environment, thereby improving the accuracy of robotic motion plans and operation of physical robotic systems. Typically, a physical camera positioned in the physical robotic environment can provide a view of the environment that can be observed by an operator. However, often the camera does not provide a complete view of the environment due to, e.g., visual occlusion by other objects and some areas being inaccessible to the camera. The systems and methods described in this specification can generate a representation of physical object boundaries based on force measurements performed in the operating environment, so as to provide a more complete representation of the environment. Furthermore, the object boundary representation can be integrated into the simulation such that the physical environment is more accurately represented. Thereby, the systems and methods described in this specification can improve the accuracy of the simulation and ensure parity between the physical environment and the virtual one.

Figure 1:
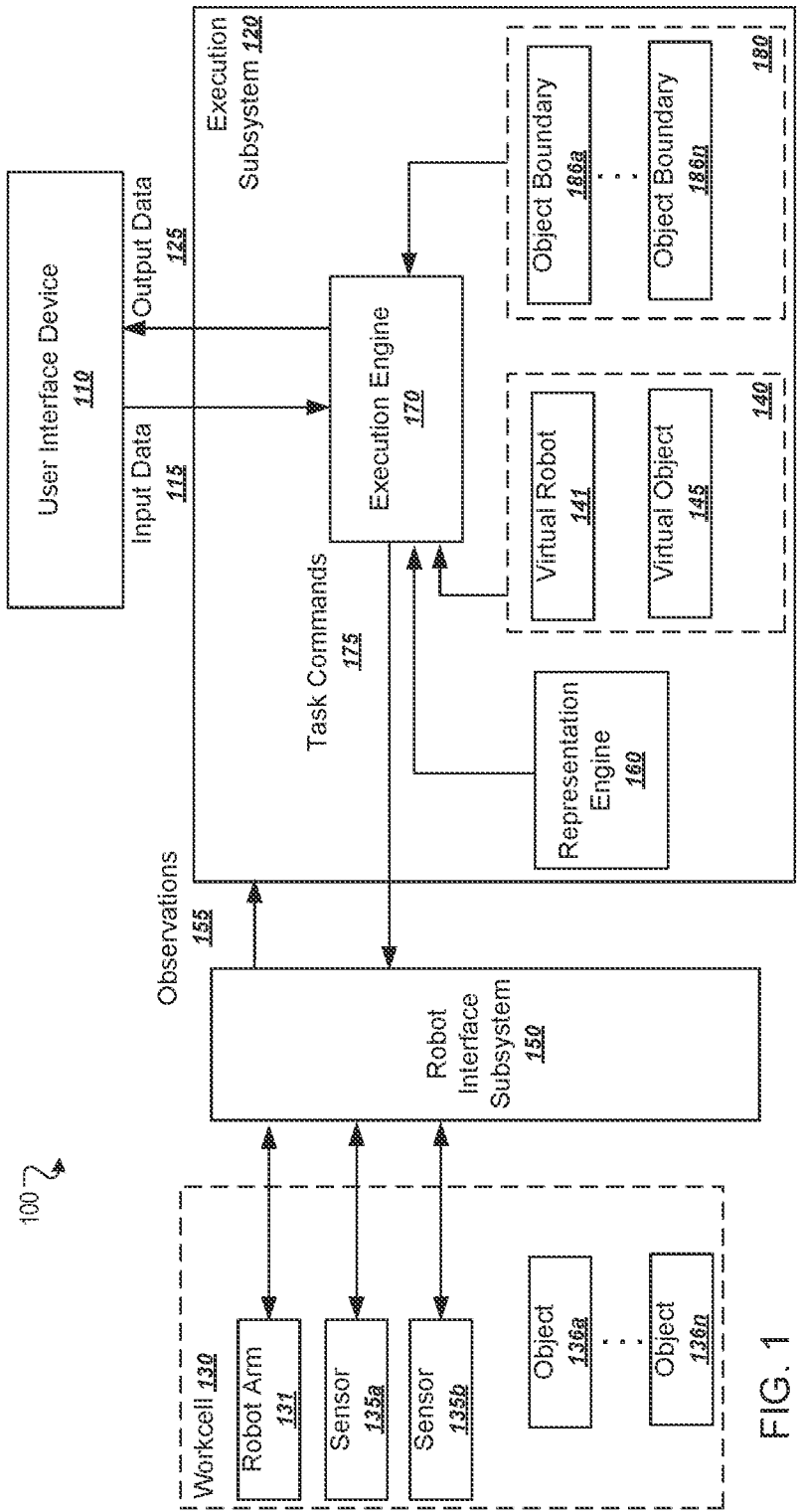
FIG. 1 is an example system for generating a representation of physical boundaries of objects in a workcell.

FIG. 1 illustrates an example system 100 for generating a representation of physical boundaries of objects 136 in a workcell 130. The system 100 can be implemented as computer programs installed on one or more computers in one or more locations that are coupled to each other through any appropriate communications network, e.g., an intranet or the Internet, or a combination of networks. The system 100 can generate a boundary representation 180 that depicts boundaries of objects 136 in the workcell 130, and a workcell representation 131 that is a virtual simulation of a copy of the physical workcell 130.

The system 100 includes a physical operating environment 130 (e.g., a physical workcell) having one or more devices. The devices can include, for example, a robot arm 131 and a sensor 135 coupled to the robot 131. The sensor 135 can be any appropriate presence sensor that is capable of generating a signal representing the presence of an object, and the sensor 135 can be configured to measure a variety of different physical properties. In one example, the sensor 135 can be a force sensor positioned at the tip of the robot arm 131 (e.g., an end effector). In another example, the sensor 135 can be a torque sensor configured to measure a torque applied to the robot 131 in x, y, and z axis. The torque sensor 135 can, e.g., measure the torque applied to one or more joints of the robot 131. In yet another example, the sensor 135 can be a force-torque sensor configured to measure the force and the torque in x, y, and z axis, applied to one or more joints of the robot 131, the tip of the robot 131, or any other appropriate location with respect to the robot 131.

The sensor 135 can interact with objects 136 in the workcell 130 by, e.g., contacting a surface of the objects 136, picking up the objects 136, etc. The workcell 130 can include any type of robot. Further, the workcell 130 can include any number of robots, robot arms 131, and objects 136. The workcell 130 can further include any other appropriate sensors, including, e.g., a camera, that can be positioned in the workcell 130, or coupled to the robot arm 131. The workcell 130 can also be provided without any objects 136.

The system 100 further includes a robot interface subsystem 150 that acts as an interface between the devices 131, 135 in the workcell 130 and an execution subsystem 120.

The robot interface system 150 can receive observations 155 from the devices 131, 135, such as sensor measurements, and information about poses of devices 131, 135 in the workcell 130. The observations 155 can further include, e.g., force and/or torque measurements obtained by one or more sensors 135. In some implementations, a camera in the workcell 130 can acquire visual data and provide it as observations 155 to the robot interface subsystem 150. The robot arm 131 can include one or more joints, each having one or more joint parameters, and the execution subsystem 120 can estimate a kinematic configuration of the robot 131 based on the joint parameters. The kinematic configuration can refer to the configuration of the joints of the robot arm 131.

The execution subsystem 120 can receive the observations 155 from the robot interface subsystem 150 and use them to control the devices 131, 135 in the workcell 130. For example, an execution engine 170 included in the execution subsystem 120 can process the observations 155 and generate task commands 175 for controlling the robot arm 131 (e.g., for controlling the movement of the robot arm 131), and output the commands 175 to the robot arm 131 and/or the sensors 135 coupled to the robot arm 131, through the robot interface subsystem 150. The task commands 175 can be programs that instruct the robot arm 131 to perform a task, e.g., to move from a first position to a second position, adopt a new kinematic configuration of the one or more joints, and/or perform a measurement with the sensor 135. For example, the robot arm 131 can move so as to tap, press on, or otherwise interact, the sensor 135 positioned at the tip of the arm 131, and/or the sensor 135 positioned at one or more joints of the robot arm 131, with the object 136a in the workcell 130. The task commands 175 can further include any other appropriate command to be performed by the robot arm 131. For example, the robot arm 131 can pick up the object 136a and measure the force with the sensor 135 while holding the object 136a.

In some implementations, the task commands 175 can be provided by a user through a user interface device 110, which can be any appropriate stationary or mobile computing device, such as a desktop computer, a workstation in a robot factory, a tablet, a smartphone, or a smartwatch. For example, a user can interact with the user interface device 110 to generate input data 115 that can include a request to generate workcell data representing physical dimensions of the workcell 130. The workcell data can refer to, e.g., the dimensions and/or locations of objects 136 in the workcell 130. The input data 115 can also include a value of a force threshold that can specify, e.g., a value of force, measured by the force sensor 135, above which it can be determined that the robot arm 131 is interacting with (e.g., touching or holding) the object 136a in the workcell 130. In another example, the input data 115 can include a value of a torque threshold that can specify, e.g., a value of torque measured by a torque sensor, positioned at one or more joints of the robot arm 131, above which it can be determined that the robot arm 131 is interacting with (e.g., touching) the object 136a in the workcell 130.

Different force (or torque) thresholds can be specified for different types of objects 136. For example, a higher value of the force threshold can be specified for an object 136a that is made of a rigid material (e.g., a metal), when compared to the value of the force threshold for an object that is made of a flexible or soft material (e.g., polyethylene). In another example, the same value of the force threshold can be specified for all types of objects 136. In yet another example, the value of the force threshold can be specified automatically by any of the components of the execution subsystem 120, with or without user input. In another example, the force (or torque) threshold can define, e.g., a value of force (or torque), measured by the sensor 135, above (or below) which the robot arm 131 automatically alters its direction of motion. For instance, the robot arm 131 can move from a first kinematic configuration to a second kinematic configuration and record the force (or torque) with the sensor 135 at the second kinematic configuration. If the force (or torque) measured by the sensor 135 is above (or below) the threshold, the robot arm 131 can automatically move back to the first kinematic configuration.

In response to receiving the input data 115 from the user, the execution engine 170 can process the input data 115 to generate the corresponding task command 175. In some implementations, the execution engine 170 can generate the task command 175 automatically, with or without user input. In response to the task command 175, the execution engine 170 can execute a calibration program that instructs the robot arm 131 to, e.g., move within the workcell 130 and record locations in the workcell 130 at which the force sensor 135 of the robot arm 131 makes a contact with the object 136. For example, the execution engine 170 can determine that the contact with the object 136 is made by receiving the force measurements from the force sensor 135 and determining if the force is above the force threshold. If the measured force is above the threshold, the execution engine 170 can determine that the contact with the object 136a is made and record the location (e.g., the kinematic configuration) of the robot arm 131 and/or the force sensor 135 at the point of contact. If the execution engine 170 determines that the force is below the threshold, the execution engine 170 can in turn determine that the contact is not made with the object 136a.

The execution engine 170 can generate output data 125 and provide it to the user interface device 110 that can present the output data 125 in a graphical user interface. For example, the execution engine 170 can generate output data 125 based on observations 155 (e.g., force, kinematic configuration, pose, and/or location measurements) received from the devices 131, 135 generated as a result of the execution of the calibration program, or based on observations 155 generated in any other appropriate manner. A user of the user interface device 110 can view the output data 125 through the user interface device 110.

The execution subsystem 120 can further include a representation engine 160 that communicates with the execution engine 170 and generates an object boundary representation 180 based on the observations 155 received from the workcell 130 (e.g., as a result of the execution of the calibration program). The representation 180 can be a digital model, e.g., a CAD model, or any other appropriate model. The representation 180 can also optionally include a representation of physical dimensions of the workcell 130 such as, e.g., a box defining the boundaries of the workcell 130 having dimensions that correspond to the dimensions of the physical workcell 130. The dimensions of the workcell 130 can be specified by means of e.g., a Cartesian coordinate system. In one example, the observations 155 received from the workcell 130 can include a location (e.g., kinematic configuration) of the robot arm 131 and/or the force sensor 135 in the workcell 130, a location of a point of contact of the force sensor 135 with the object 136a, and a measurement of force obtained by the force sensor 135. The force sensor 135 can measure the force in response to interacting with the object 136a, or without interacting with any objects in the workcell 130. In this latter case, the force measurement can be smaller than the force measurement obtained from interacting with the object 136a.

On the basis of one or more of the observations 155 received from the devices 131, 135 in the workcell 130, the engine 160 can generate the boundary representation 180 that can include a depiction of the object boundary 186a that at least partially represents a boundary of the physical object 136a in the workcell 130. The engine 160 can generate the object boundary 186a in the representation 180 at a location that corresponds to the location where the force sensor 135 of the robot arm 131 recorded a force above a particular threshold, e.g., at the point of contact of the force sensor 131 with the object 136a in the workcell 130.

For example, if the force sensor 135 touches an object 136a in the workcell 130, the location of the point of contact and the measurement of force can be provided as observations 155 to the execution engine 170. In another example, if the torque sensor 135 records a resistance above a threshold, the location at which the torque sensor recorded the resistance above the threshold can be indicative of, e.g., the robot arm 131 touching the object 136a with one or more joints of the robot 131, and the measurement of torque can be provided as observations 155 to the execution engine 170.

The execution engine 170 can process the observations 115 and determine if the force measured by the force sensor 135 is above the force threshold. If the engine 170 makes a determination that the force is above the threshold, the engine 170 can, in turn, determine that an object boundary is present at the location of the point of contact. Accordingly, the execution engine 170 can provide input data to the representation engine 160 that can generate a depiction of the object boundary 186a in the representation 180 at a location corresponding to the location of the point of contact of the force sensor 135 and the object 136a. However, if the engine 170 determines that the force is below the threshold, the engine 170 can determine that the object 136a is not present at the location where the force was recorded.

In some implementations, the object boundary 186a in the representation 180 can be represented as one or more points that are positioned at one or more locations that correspond to the one or more locations in the physical workcell 130 where the force sensor 135 of the robot arm 131 measured a force above the threshold. By way of example, the robot arm 131 can move from a first location to a second location, and measure the force using the force sensor 135 at both locations. At the first location, the force sensor 135 can measure a force that is below a particular threshold, and the engine 170 can determine that the object 136a is not present at that location. At the second location, the force sensor 135 can measure a force that is determined to be above the threshold, and the representation engine 160 can generate a marker indicating the object boundary 186a in the workcell representation 180 at a location that corresponds to the location of the point of contact of the sensor 135 with the object 136a in the workcell 130.

In some implementations, a human operator can physically guide the robot arm 131 in the workcell 130 and manipulate the arm 131 such that the force sensor 136 touches the objects 136. In some implementations, the arm 131 can be guided in the workcell 130 automatically via the calibration program such that the force sensor 136 touches the objects 136 without physical interaction with the human operator. In some implementations, the robot arm 131 can perform an autonomous exploration of the workcell 130 and record locations of the positions where the force sensor 135 of the robot arm 131 recorded a force above the threshold. In all implementations, the process can be repeated any number of times. As an example, the process can terminate when the robot arm 131 has interacted with all objects 136, and/or the engine 160 generated object boundary representations 180 for all the objects in the workcell 130.

The engine 160 can automatically infer, and generate representations of, the object boundaries 180 in the representation 180 based on one or more force measurements and locations. By way of example, if the object 136a in the workcell 130 is a table, the robot arm 131 can interact with the four corners of the tabletop, and on the basis of the locations of the points of contact at each corner, and the force measurements at each location, generate a representation of the entire plane of the tabletop. The engine 160 can generate a marker in the representation for each of the four corners of the tabletop and connect the markers by a line, thereby generating a depiction of the plane of the tabletop. In other words, the precise position of the tabletop can be determined and depicted in the boundary representation 180 based only on four instances of the measurement of force and locations in the workcell 130.

Further, the robot arm 131 can be guided by the calibration program, by the human operator, or both, to locations in the workcell 130 that may be difficult to measure by other means, e.g., through a camera. For example, the robot arm 131 can be guided under a tabletop in the workcell 130 and perform measurements with the force sensor 135 so that the engine 160 could generate a depiction of the boundaries under the tabletop in the representation 180. Accordingly, a comprehensive map of the surroundings of the robot 131 in the workcell 130, including locations inaccessible via a camera or by other means, can be generated by the engine 160. The user interface device 110 can generate a view of the object boundaries 186. For example, the representation engine 160 can provide output data 125 (e.g., the object boundary representation 180) to the user interface device 110, and a user can view the representation 180, including the object boundaries 186, in the graphical user interface of the user interface device 110.

Further, the representation engine 160 can generate a workcell representation 140 that can be a simulation that generates a virtual copy of the physical workcell 130. The workcell simulation 140 can be a digital model, e.g., a CAD model, or any other appropriate model. The workcell simulation 140 can include any of: one or more virtual robots 141 that represent the one or more physical robots (e.g., the robot arm 131, or other robots) in the workcell 130, one or more virtual objects 146 that represent the one or more physical objects 136 in the workcell 130, and one or more virtual sensors that represent physical sensors (e.g., the force sensor 135, or other sensors) in the workcell 130. The workcell simulation 140 can be simulated according to one or more simulation parameters. The simulation parameters can include parameters that define dimensions, or other physical parameters, of any of: the one or more virtual robots 141, the one or more virtual objects 145, the one or more virtual sensors, and the virtual workcell 140.

The user interface device 110 can generate a view of the virtual workcell 140. For example, the representation engine 160 can provide output data 125 (e.g., the workcell representation 140) to the user interface device 110, and a user can view the representation 140 in the graphical user interface of the user interface device 110.

The virtual workcell 140 can be updated according to the boundary representation 180 generated by the engine 160 as a result of the execution of the calibration program. As described above, the boundary representation 180 can depict an object boundary 186a generated from the force sensor 135 interaction with the corresponding physical object 136a in the workcell 130. The engine 160 can update the simulation parameters defining, e.g., the dimensions of the virtual object 145 in the simulation 140 that represents the physical object 136a in the workcell 130. For example, the object boundary 186a can be a depiction of a plane of tabletop.

The engine 160 can apply the depiction to the simulation 140 by updating the simulation parameters that define the size of the virtual tabletop such that the dimensions of the virtual tabletop in the simulation 140 reflect the dimensions of the tabletop in the representation 180. Accordingly, by applying the representation 180, obtained from measurements generated as a result of the execution of the calibration program, or otherwise, to the simulation 140, the dimension of virtual objects 145 in the virtual workcell 140 can more closely match the dimensions of the physical objects 136 in the physical workcell 130 that the simulation represents, thereby reducing parity between the physical operating environment and its virtual counterpart.

After updating the virtual workcell 140, the virtual robots 141 can be simulated performing a task. The execution engine 170 can generate task commands 175 according to the input data 115 received from the user interface device 110, or otherwise, and provide the task commands 175 to the engine 160. The engine 160 can simulate virtual robots 141 performing the task.

Continuing with the tabletop example, the simulation of the workcell 140 can be updated such that the virtual tabletop has dimensions that reflect the dimensions of the boundaries of the tabletop in the representation 180. A user can interact with the user interface device 110 to instruct the virtual robot 141 to pick up the virtual object 145 and place the object 145 on the virtual tabletop. The execution engine 170 can determine whether the simulation task succeeded (e.g., whether the virtual robot 141 successfully placed the virtual object 145 on the virtual tabletop) by computing a performance measure for the task, which can then be presented in the graphical user interface of the user interface device 110.

Further, a prompt to perform the task in the physical workcell 130 (e.g., the physical robot 131 picking up the physical object 136a and placing it on the physical tabletop) can be generated by the execution engine 170 and presented on the user interface device 110 (e.g., a window with text asking if the task should be performed, and "yes"/"no" buttons). A user can interact with the user interface device 110 by e.g., clicking on the "yes" button, which can be received as input data 115 by the execution engine 170. In response, the execution engine 170 can generate task commands 175, send the commands 175 to the physical robot 131 via the robot interface subsystem 150, and drive the robot 131 to perform the task in the workcell 130 (e.g., to place the object 136a on the physical tabletop in the workcell 130). In some implementations, the simulated virtual robot 141 and the corresponding physical robot that performs the task in the workcell 130 can be different robots from the robot arm 131 that obtains force measurements as a result of the execution of the calibration program.

Accordingly, because the virtual environment is updated on the basis of the boundary representation to more accurately represent the physical operating environment, the simulation of the task, in turn, more accurately represents the task to be performed by physical robots in the workcell, which increases the precision of contact operations and improves the safety and efficiency of the physical robotic system when it performs the task. By adjusting the simulation parameters on the basis of the boundary representation, the program can be fine-tuned before it is provided to the physical system, so as to enhance the system's performance on the manufacturing floor and reduce the likelihood of accidents and misalignments.

Figure 2:
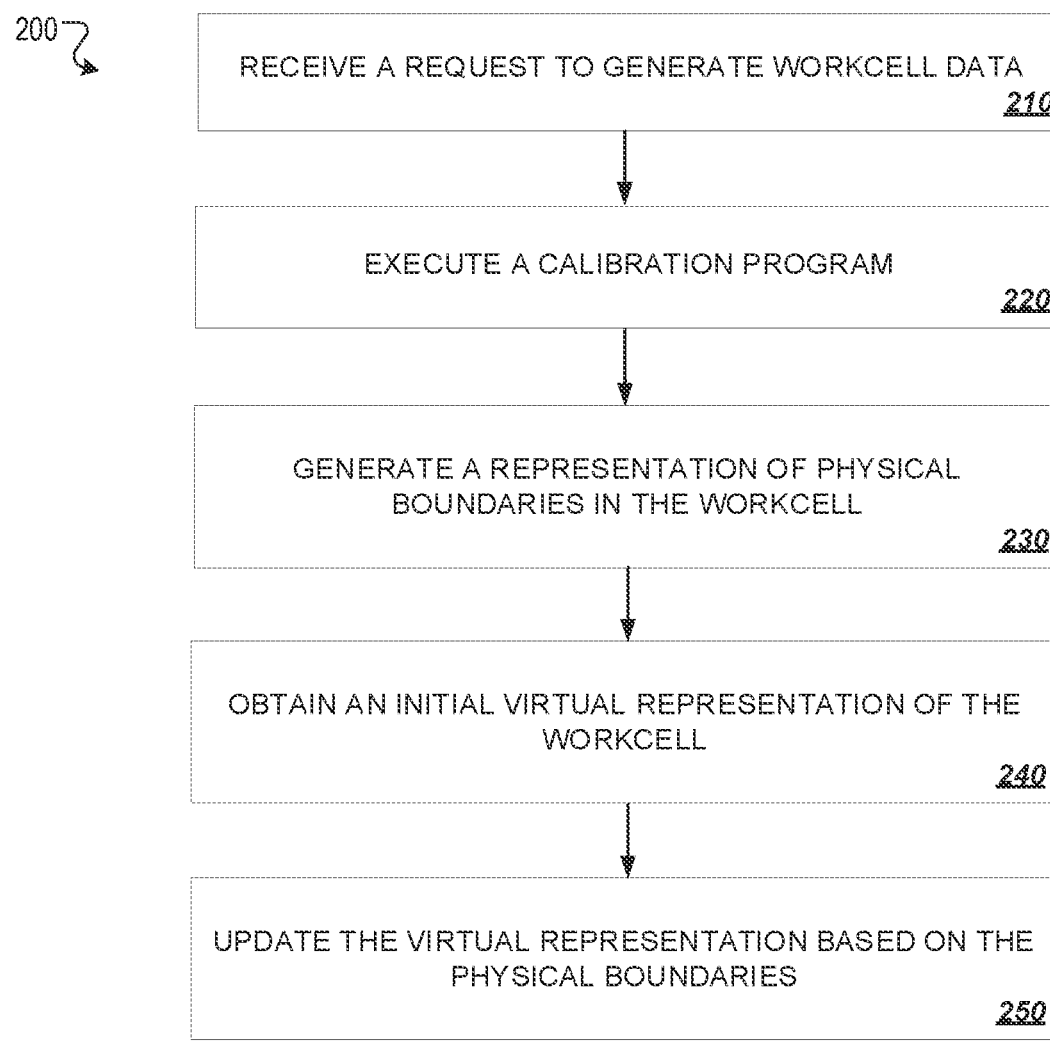
FIG. 2 is a flow diagram of an example process for generating a representation of physical boundaries of objects in a workcell.

FIG. 2 is a flow diagram of an example process 200 for generating a representation of physical boundaries in a workcell. For convenience, the process 200 will be described as being performed by a system of one or more computers located in one or more locations. For example, a system for generating a representation of physical boundaries in a workcell, e.g., the system 100 of FIG. 1, appropriately programmed, can perform the process 200.

The system receives a request to generate workcell data representing the physical dimensions of a workcell having a physical robot arm (210). As described above, the request can be provided by a user through a user interface device. In some implementations, the request can be provided automatically without user input. The workcell data can refer to dimensions and/or locations of objects, robot poses, kinematic configurations of robots, and any other appropriate data.

The system executes a calibration program that causes the robot arm to move within the workcell and record locations within the workcell at which the robot arm made contact with an object (220). Recording the locations within the workcell at which the robot arm made contact with the object can include recording locations at which the force sensor of the robot arm recorded resistance above a force threshold. As described above, a human operator can guide the robot to different locations in the workcell so as to record force measurements with the force sensor at these locations. In some implementations the robot can perform autonomous exploration of the workcell and autonomously record force measurements at various locations in the workcell.

In some implementations, executing the calibration program can include automatically altering a direction of motion of the robot arm when the force sensor of the robot arm senses resistance above the force threshold. As described above, if the robot records a force above the threshold, the robot can, e.g., automatically return to a previous kinematic configuration before the kinematic configuration at which the force above the threshold was recorded.

Executing the calibration program can further include causing the robot to make contact with contact points that are not among the plurality of contact points generated from the operator-guided survey including causing the robot to make contact with a point that is between two points generated from the operator-guided survey. For example, as described above, the human operator can guide the robot to particular locations in the workcell and record the force at the locations with the force sensor (e.g., at the four corners of a tabletop). The calibration program can cause the robot to make contact with a point that was not included in the operator-guided survey (e.g., a point between any two of the four corners of the tabletop).

Executing the calibration program can further include trying different kinematic configurations for the robot to access a same particular point in the workcell, and designating one or more of the kinematic configurations for the particular point as invalid configurations due to sensed contact of the robot arm with one or more objects in the workcell. For example, the robot can try a first kinematic configuration and a second kinematic configuration to reach the same point in the workcell. In the first kinematic configuration, the robot can reach the point without recording a force above the threshold. In the second kinematic configuration, the robot can reach the point and record a force above the threshold, indicating, e.g., that the robot encountered an object. In the case that it is desirable to find the kinematic configuration of the robot for the point in the workcell that would not result in the robot encountering any objects, the second kinematic configuration can accordingly be designated as invalid.

The system generates, from the locations within the workcell at which a force sensor of the robot arm recorded resistance above a force threshold, a representation of physical boundaries in the workcell (230). As described above, the system can generate a depiction (or a marker) at a location in the boundary representation that corresponds to the location in the physical workcell where the robot recorded a force (e.g., a resistance) above the threshold, in other words, at a location that corresponds to the location of the contact point of the robot with the object in the workcell.

The system obtains an initial virtual representation of the workcell (240). As described above, the system can generate a virtual representation of the physical workcell, including, e.g., virtual robots and virtual objects. The representation can be simulated according to one or more simulation parameters that can define, e.g., the dimensions of virtual objects and the dimensions of virtual robots in the virtual workcell.

The system updates the initial virtual representation of the workcell according to the representation of physical boundaries generated from executing the calibration program (250). As described above, the system can update the simulation parameter that defines the dimensions of the virtual object, that is a virtual copy of the physical object in the workcell, on the basis of the object boundary representation, such that the dimensions of the virtual object match the dimensions of the physical object in the workcell.

Updating the initial virtual representation can include updating the dimensions of an object in the workcell or updating the location of an object in the workcell. Updating the location of an object can include identifying a virtual representation of an object in the workcell, updating the calibration program to cause the robot to contact the object to determine a location of the physical object in the workcell, and updating the virtual representation with the determined location of the object. For example, the robot can be instructed to contact a particular object in the workcell and record the force at the contact point. On the basis of the location of the contact point of the force sensor and the object in the workcell, the simulation parameter that defines the location of the corresponding virtual object can be updated to, e.g., reflect the location of the contact point in the workcell.

In some implementations, the system can identify intersections between edges in the virtual representation of the workcell and update the calibration program to cause the robot to contact the edges in the virtual representation. For example, the robot can be instructed to contact object boundaries between objects in the workcell (e.g., an intersection between a boundary of a box placed on a tabletop, and the plane of the tabletop) and record a force at the boundary. The boundary representation can accordingly be updated. The simulation parameters of the virtual workcell can then be updated on the basis of the boundary representation such that, e.g., the intersection between the virtual box and the virtual tabletop more closely matches the intersection of the same in the physical workcell.

The system can identify, from the virtual representation of the workcell, a planar surface of a physical object in the workcell, update the calibration program to cause the robot to make contact with one or more points on the planar surface of the physical object in the workcell, and update, within the virtual representation of the workcell, the representation of the planar surface according to the one or more points on the planar surface that the robot contacted during execution of the calibration program.

Accordingly, the method can obtain measurements representing, e.g., unique and difficult to access areas of the workcell and update the simulation of the workcell accordingly, thereby increasing parity between the physical workcell and the workcell simulation and improving the performance of the system on the manufacturing floor.

Figure 4:
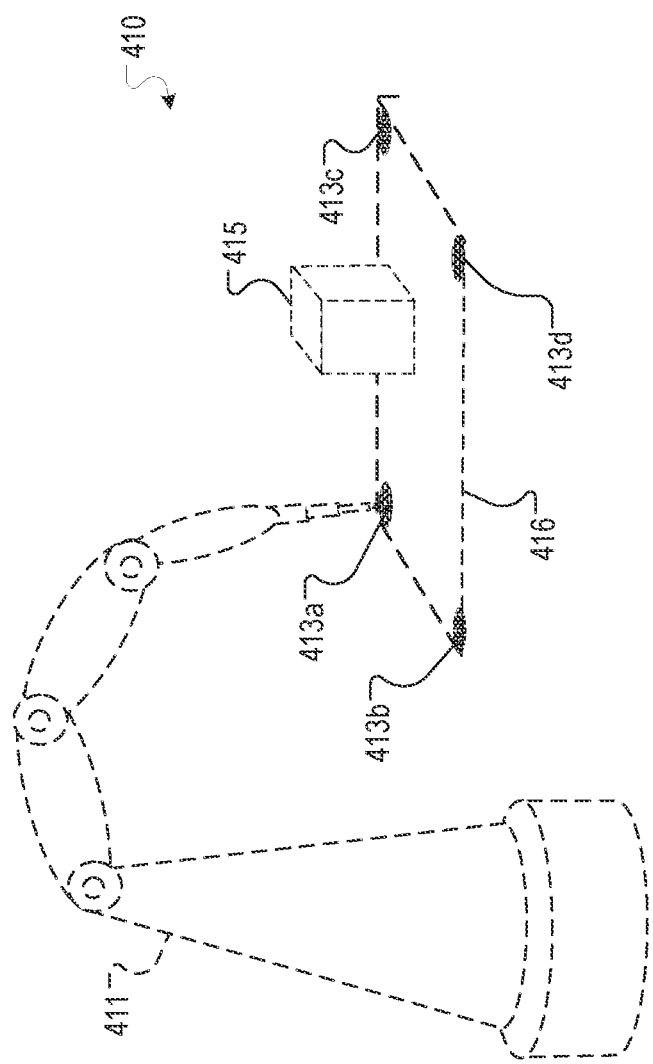
FIG. 4 is an example simulation of a virtual workcell updated according to a representation of physical boundaries of objects.

FIG. 4 is an example of generating a representation of physical boundaries of objects 316 in a workcell 310. The workcell 310 can include a physical robot arm 311 with a force sensor 312 (e.g., an end effector) positioned at the tip of the robot arm 311. The robot arm 311 can assume any variety of configurations. For example, the robot arm 311 can include multiple fingers, and the force sensor 312 can be integrated with the fingers. The workcell 310 can further include a table 316 with an object 315 positioned on the table 316. As described above, a system (e.g., the system 100 in FIG. 1) can receive a request to generate workcell data representing the physical dimensions of the workcell 310. The system can execute the calibration program that causes the robot arm 311 to move within the workcell 310 and record locations within the workcell 310 at which the robot arm 311 made contact with the object 316. For example, the calibration program can cause the force sensor 312 of the robot 311 to interact with (e.g., touch) the table 316 at a first contact point 313a and record a force (e.g., a resistance) in response to the interaction, a location of the interaction, and/or the kinematic configuration (e.g., a configuration of one or more joints 317) of the robot 311. The robot 311 can contact the table 316 at multiple contact points, which can be, e.g., four corners of the table 313a, 313b, 313c, 313d.

Executing the calibration program can include trying different kinematic configurations of the robot 311 to access the same particular point in the workcell, e.g., to access a point above the surface of the table 316. The calibration program can try different kinematic configurations of the robot 311, and one or more of the kinematic configurations of the robot for the particular point can be designated as invalid due to sensed contact of the robot 311 with one or more objects in the workcell 310. The sensed contact can include a contact of the sensor 312 positioned at the tip of the arm 311, and/or a contact of the one or more joints 317 of the arm 311. For example, if it is desirable to reach a point above the surface of the table 316 without contacting any objects in the workcell 310, the kinematic configuration of the robot 311 that causes the robot 311 to record a resistance above a threshold due to, e.g., contacting the table with the force sensor 312 (or with one or more joints 317 of the robot 311) at the contact point 313a, can be designated as invalid.

In another example, the robot arm 311 can include, e.g., an elbow joint, and in a first kinematic configuration the robot 311 may not be able to reach a point e.g., between the legs of the table 316. In other words, the robot arm 311 may record a force with the sensor 312 (or a torque with the sensor positioned at one or more joints 317 of the robot 311) due to sensed contact of the robot (e.g., of one or more parts coupled to the elbow joint of the robot, or of the elbow joint itself) with one or more objects (e.g., a leg of the table 316) in the workcell 310 while trying to reach the point in the first kinematic configuration. The first kinematic configuration can be designated as invalid.

On the other hand, the robot can try different kinematic configurations and discover a second, different, configuration to reach the same point that does not lead to the force sensor 312 (or a torque sensor positioned at one or more joints 317) of the robot arm 311 recording a resistance above a threshold. In other words, in the second configuration, the robot 311 can reach the point without contacting one or more objects in the workcell 310, e.g., the robot 311 can maneuver the elbow joint such that the robot 311 doesn't contact the leg of the table 316. The second configuration is an example of a valid kinematic configuration of the robot arm 311.

FIG. 4 is an example simulation of a virtual workcell 410 updated according to a representation of physical boundaries of objects. The virtual workcell 410 can represent a physical workcell, e.g., the physical workcell 310 in FIG. 3. The simulation 410 can include a virtual robot arm 411, representing a physical robot arm in the physical workcell (e.g., robot arm 311 in workcell 310 in FIG. 3), and virtual objects, e.g., a virtual table 416 and a virtual box 415, representing a physical table and a physical box in the workcell (e.g., the table 316 and the box 315 in FIG. 3).

As described above, executing a calibration program can cause the physical robot arm to move within the workcell and record locations within the workcell at which the robot arm made contact with an object. From the locations within the workcell at which a force sensor of the robot arm recorded resistance above a force threshold (e.g., made contact with the object), a representation of physical boundaries in the workcell can be generated.

Figure 3:
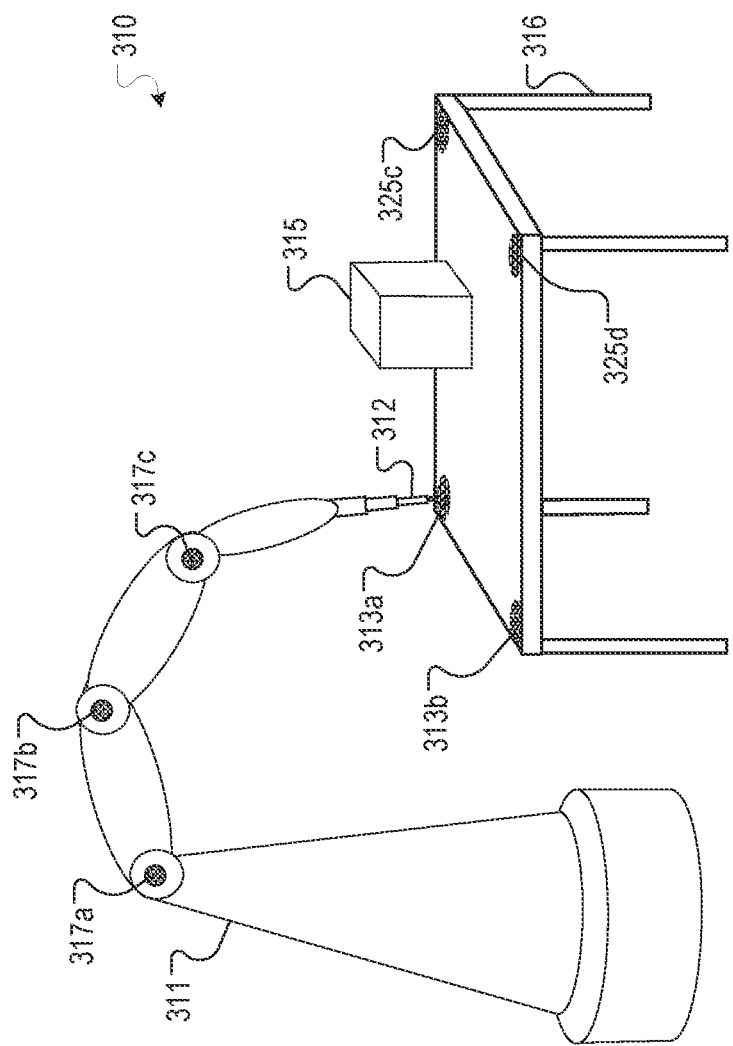
FIG. 3 is an example of generating a representation of physical boundaries of objects in a workcell.

The boundary representation can include, for example, a marker 413 for each of the locations of contact points (e.g., the contact points 313 in FIG. 3) at which the robot interacted with the physical object (e.g., the table 316 in FIG. 3). The simulation of the workcell 410 can be updated by, e.g., including the markers 413a, 413b, 413c, 413d, defining the boundaries of the physical table (e.g., the table 316 in FIG. 1) in the simulation of the virtual workcell 410, and updating the simulation parameters defining the dimensions of the virtual table 416 such that the dimensions of the virtual table 416 align with the markers 413. In this way, the dimensions of the virtual table 416 in the simulation 410 can be updated to match the dimensions of the physical table (e.g., the table 316 in FIG. 3) on the basis of the boundary representation of the physical table generated as a result of the execution of the calibration program.

As described above, after updating the simulation parameters based on the boundary representation, the virtual robot 411 can be simulated performing a task. For example, the robot 411 can be simulated picking up the virtual box 415 and placing it on the virtual table 416. If the task succeeded, the program can trigger the physical robot in the physical workcell to perform the task.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a computer-implemented method comprising:
receiving a request to generate workcell data representing physical dimensions of a workcell having a physical robot arm;
executing a calibration program that causes the physical robot arm to move within the workcell and record locations within the workcell at which the robot arm made contact with an object;
generating, from the locations within the workcell at which one or more sensors of the robot arm recorded a resistance above a threshold, a representation of physical boundaries in the workcell;
obtaining an initial virtual representation of the workcell; and
updating the initial virtual representation of the workcell according to the representation of physical boundaries generated from executing the calibration program.

Embodiment 2 is the computer-implemented method of embodiment 1, wherein the one or more sensors includes a force sensor, and wherein recording the locations within the workcell at which the physical robot arm made contact with the object comprises recording locations at which the force sensor of the robot arm recorded the resistance above the threshold.

Embodiment 3 is the computer-implemented method of any one of embodiments 1-2, wherein the one or more sensors include a torque sensor, and wherein recording the locations within the workcell at which the physical robot arm made contact with the object comprises recording locations at which the torque sensor of the robot arm recorded the resistance above the threshold.

Embodiment 4 is the computer-implemented method of any one of embodiments 1-3, wherein executing the calibration program comprises automatically altering a direction of motion of the robot arm when the one or more sensors of the robot arm record the resistance above the threshold.

Embodiment 5 is the computer-implemented method of any one of embodiments 1-4, further comprising:
identifying intersections between edges in the virtual representation of the workcell; and
updating the calibration program to cause the robot to contact the edges in the virtual representation.

Embodiment 6 is the computer-implemented method of any one of embodiments 1-5, wherein updating the initial virtual representation comprises updating the dimensions of an object in the workcell or updating the location of an object in the workcell.

Embodiment 7 is the computer-implemented method of embodiment 6, wherein updating the location of the object comprises:
identifying a virtual representation of a physical object in the workcell;
updating the calibration program to cause the robot to contact the physical object to determine a location of the physical object in the workcell; and
updating the virtual representation with the determined location of the physical object.

Embodiment 8 is the computer-implemented method of any one of embodiments 1-7, further comprising:
identifying, from the virtual representation of the workcell, a planar surface of a physical object in the workcell;
updating the calibration program to cause the robot to make contact with one or more points on the planar surface of the physical object in the workcell; and
updating, within the virtual representation of the workcell, the representation of the planar surface according to the one or more points on the planar surface that the robot contacted during execution of the calibration program.

Embodiment 9 is the computer-implemented method of any one of embodiments 1-8, further comprising:
receiving a plurality of contact points generated from an operator-guided survey using the robot arm to contact objects in the workcell,
wherein executing the calibration program comprises causing the robot to make contact with contact points that are not among the plurality of contact points generated from the operator-guided survey.

Embodiment 10 is the computer-implemented method of embodiment 9, wherein executing the calibration program comprises causing the robot to make contact with contact points that are not among the plurality of contact points generated from the operator-guided survey comprises causing the robot to make contact with a point that is between two points generated from the operator-guided survey.

Embodiment 11 is the computer-implemented method of any one of embodiments 1-10, wherein executing the calibration program comprises:
trying different kinematic configurations for the robot to access a same particular point in the workcell; and
designating one or more of the kinematic configurations for the particular point as invalid configurations due to sensed contact of the robot arm with one or more objects in the workcell.

Embodiment 12 is a system comprising one or more computers, and one or more storage devices communicatively coupled to the one or more computers, wherein the one or more storage devices store instructions that, when executed by the one or more computers, cause the one or more computers to perform the computer-implemented method of any one of embodiments 1 to 11.

Embodiment 13 is one or more non-transitory computer storage media storing instructions that, when executed by one or more computers, cause the one or more computers to perform the computer-implemented method of any one of embodiments 1 to 11.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a request to generate workcell data representing physical dimensions of a workcell having a physical robot arm;
   receiving a plurality of contact points generated from an operator-guided survey using the physical robot arm to contact object in the workcell;
   executing a calibration program that causes the physical robot arm to move within the workcell and record locations within the workcell at which the physical robot arm made contact with an object including evaluating different kinematic configurations for a same particular point within the workcell, including causing the physical robot arm to make contact with contact points that are not among the plurality of contact points generated from the operator-guided survey and that are between two contact points generated from the operator-guided survey;
   determining that a first kinematic configuration for the particular point is valid and determining that a second kinematic configuration for the particular point is invalid due to contact of the physical robot arm with an object in the workcell;
   generating, from the locations within the workcell at which one or more sensors of the physical robot arm recorded a resistance above a threshold, a representation of physical boundaries in the workcell;
   obtaining an initial virtual representation of the workcell;
   updating the initial virtual representation of the workcell according to the representation of physical boundaries generated from executing the calibration program;
   receiving a request to generate a motion plan for an end effector of the physical robot to reach the particular point within the workcell; and
   based on determining that executing the calibration program caused the physical robot to contact the object in the second kinematic configuration, generating a motion plan for the particular point in the workcell that uses the first kinematic configuration to avoid a collision of the physical robot with the object in the workcell.

2. The method of claim 1, wherein the one or more sensors include a force sensor, and wherein recording the locations within the workcell at which the physical robot arm made contact with the object comprises recording locations at which the force sensor of the physical robot arm recorded the resistance above the threshold.

3. The method of claim 1, wherein the one or more sensors include a torque sensor, and wherein recording the locations within the workcell at which the physical robot arm made contact with the object comprises recording locations at which the torque sensor of the physical robot arm recorded the resistance above the threshold.

4. The method of claim 1, wherein executing the calibration program comprises automatically altering a direction of motion of the physical robot arm when the one or more sensors of the physical robot arm record the resistance above the threshold.

5. The method of claim 1, further comprising:
   identifying intersections between edges in the virtual representation of the workcell; and
   updating the calibration program to cause the physical robot arm to contact the edges in the virtual representation.

6. The method of claim 1, wherein updating the initial virtual representation comprises updating the dimensions of an object in the workcell or updating the location of an object in the workcell.

7. The method of claim 6, wherein updating the location of the object comprises:
   identifying a virtual representation of a physical object in the workcell;
   updating the calibration program to cause the robot to contact the physical object to determine a location of the physical object in the workcell; and
   updating the virtual representation with the determined location of the physical object.

8. The method of claim 1, further comprising:
   identifying, from the virtual representation of the workcell, a planar surface of a physical object in the workcell;
   updating the calibration program to cause the robot to make contact with one or more points on the planar surface of the physical object in the workcell; and
   updating, within the virtual representation of the workcell, the representation of the planar surface according to the one or more points on the planar surface that the robot contacted during execution of the calibration program.

9. A system comprising one or more computers, and one or more storage devices communicatively coupled to the one or more computers, wherein the one or more storage devices store instructions that, when executed by the one or more computers, cause the one or more computers to perform operations comprising:
   receiving a request to generate workcell data representing physical dimensions of a workcell having a physical robot arm;
   receiving a plurality of contact points generated from an operator-guided survey using the physical robot arm to contact object in the workcell;
   executing a calibration program that causes the physical robot arm to move within the workcell and record locations within the workcell at which the physical robot arm made contact with an object including evaluating different kinematic configurations for a same particular point within the workcell, including causing the physical robot arm to make contact with contact points that are not among the plurality of contact points generated from the operator-guided survey and that are between two contact points generated from the operator-guided survey;

determining that a first kinematic configuration for the particular point is valid and determining that a second kinematic configuration for the particular point is invalid due to contact of the physical robot arm with an object in the workcell;

generating, from the locations within the workcell at which one or more sensors of the physical robot arm recorded a resistance above a threshold, a representation of physical boundaries in the workcell;

obtaining an initial virtual representation of the workcell;

updating the initial virtual representation of the workcell according to the representation of physical boundaries generated from executing the calibration program;

receiving a request to generate a motion plan for an end effector of the physical robot to reach the particular point within the workcell; and based on determining that executing the calibration program caused the physical robot to contact the object in the second kinematic configuration, generating a motion plan for the particular point in the workcell that uses the first kinematic configuration to avoid a collision of the physical robot with the object in the workcell.

10. The system of claim 9, wherein the one or more sensors include a force sensor, and wherein recording the locations within the workcell at which the physical robot arm made contact with the object comprises recording locations at which the force sensor of the physical robot arm recorded the resistance above the threshold.

11. The system of claim 9, wherein the one or more sensors include a torque sensor, and wherein recording the locations within the workcell at which the physical robot arm made contact with the object comprises recording locations at which the torque sensor of the physical robot arm recorded the resistance above the threshold.

12. The system of claim 9, wherein executing the calibration program comprises automatically altering a direction of motion of the physical robot arm when the one or more sensors of the physical robot arm record the resistance above the threshold.

13. The system of claim 9, further comprising:
identifying intersections between edges in the virtual representation of the workcell; and
updating the calibration program to cause the physical robot arm to contact the edges in the virtual representation.

14. One or more non-transitory computer storage media storing instructions that, when executed by one or more computers, cause the one or more computers to perform operations comprising:

receiving a request to generate workcell data representing physical dimensions of a workcell having a physical robot arm;

receiving a plurality of contact points generated from an operator-guided survey using the physical robot arm to contact object in the workcell;

executing a calibration program that causes the physical robot arm to move within the workcell and record locations within the workcell at which the physical robot arm made contact with an object including evaluating different kinematic configurations for a same particular point within the workcell, including causing the physical robot arm to make contact with contact points that are not among the plurality of contact points generated from the operator-guided survey and that are between two contact points generated from the operator-guided survey;

determining that a first kinematic configuration for the particular point is valid and determining that a second kinematic configuration for the particular point is invalid due to contact of the physical robot arm with an object in the workcell;

generating, from the locations within the workcell at which one or more sensors of the physical robot arm recorded a resistance above a threshold, a representation of physical boundaries in the workcell;

obtaining an initial virtual representation of the workcell;

updating the initial virtual representation of the workcell according to the representation of physical boundaries generated from executing the calibration program;

receiving a request to generate a motion plan for an end effector of the physical robot to reach the particular point within the workcell; and based on determining that executing the calibration program caused the physical robot to contact the object in the second kinematic configuration, generating a motion plan for the particular point in the workcell that uses the first kinematic configuration to avoid a collision of the physical robot with the object in the workcell.

15. The one or more non-transitory computer storage media of claim 14, wherein the one or more sensors include a force sensor, and wherein recording the locations within the workcell at which the physical robot arm made contact with the object comprises recording locations at which the force sensor of the physical robot arm recorded the resistance above the threshold.

16. The one or more non-transitory computer storage media of claim 14, wherein the one or more sensors include a torque sensor, and wherein recording the locations within the workcell at which the physical robot arm made contact with the object comprises recording locations at which the torque sensor of the physical robot arm recorded the resistance above the threshold.

17. The one or more non-transitory computer storage media of claim 14, wherein executing the calibration program comprises automatically altering a direction of motion of the robot arm when the one or more sensors of the physical robot arm record the resistance above the threshold.

* * * * *